US008008812B2

(12) United States Patent
Chen et al.

(10) Patent No.: US 8,008,812 B2
(45) Date of Patent: *Aug. 30, 2011

(54) PAPER SHREDDER CONTROL SYSTEM RESPONSIVE TO TOUCH-SENSITIVE ELEMENT

(75) Inventors: Kevin Chen, Rancho Palos Verdes, CA (US); Chung Shih Tsai, Hawthorne, CA (US); Hsin-Hsiung Chen, Shanghai (CN)

(73) Assignee: Aurora Office Equipment Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/841,992

(22) Filed: Jul. 22, 2010

(65) Prior Publication Data

US 2010/0282880 A1 Nov. 11, 2010

Related U.S. Application Data

(63) Continuation of application No. 12/576,493, filed on Oct. 9, 2009, which is a continuation of application No. 11/827,798, filed on Jul. 12, 2007, now Pat. No. 7,622,831, which is a continuation-in-part of application No. 11/468,651, filed on Aug. 30, 2006, now Pat. No. 7,471,017.

(30) Foreign Application Priority Data

Aug. 19, 2006 (CN) ...................... 2006 6 200439955

(51) Int. Cl.
*H02H 11/00* (2006.01)

(52) U.S. Cl. ....................................................... 307/326

(58) Field of Classification Search .................. 307/112, 307/326; 241/34, 37.5; 192/130; 82/362

See application file for complete search history.

(56) References Cited

U.S. PATENT DOCUMENTS 3,111,800 A 11/1963 Quianthy (Continued)

FOREIGN PATENT DOCUMENTS

CN 2372057 4/2000

(Continued)

OTHER PUBLICATIONS

Andrew J. Scarlett et al., Guard interlockling for self-propelled harvesting machinery, Silsoe Research Institute, HSE Book 2002.

(Continued)

*Primary Examiner* — Jared J Fureman
*Assistant Examiner* — Carlos Amaya
(74) *Attorney, Agent, or Firm* — Wang, Hartmann, Gibbs & Cauley; Franklin E. Gibbs

(57) ABSTRACT

The invention is directed to a touch-sensitive paper shredder control system. The touching feature is implemented through a series of electronic circuits, taking input from a conductive touch panel on the shredder feed throat, processing the signal, and through a motor driving circuit, stopping the mechanical parts of the shredder. The system has a touch detection circuit unit, which contains a bioelectricity controlled switching circuit to sense the conductive touch panel. The bioelectricity controlled switching circuit is configured to trigger a ground switching circuit in the touch detection circuit unit which outputs to a multifunction control circuit unit. The control circuit unit then takes care of the remaining protection issues. The touching device for paper shredders protects humans and other living beings including pets from injuries through automatic and real time monitoring. The complete control process is both safe and sensitive.

20 Claims, 11 Drawing Sheets

U.S. PATENT DOCUMENTS

| | | | |
|---|---|---|---|
| 3,629,530 | A | 12/1971 | Fischer |
| 3,724,766 | A | 4/1973 | Bosland |
| 3,728,501 | A | 4/1973 | Larson et al. |
| 3,746,815 | A | 7/1973 | Drummer |
| 3,769,473 | A | 10/1973 | Lay |
| 3,780,246 | A | 12/1973 | Beckering et al. |
| 3,785,230 | A | 1/1974 | Lokey |
| 3,829,850 | A | 8/1974 | Guetersloh |
| 3,860,180 | A | 1/1975 | Goldhammer |
| 3,873,796 | A | 3/1975 | Worobec et al. |
| 3,947,734 | A | 3/1976 | Fyler |
| 3,952,239 | A | 4/1976 | Owing et al. |
| 3,953,696 | A | 4/1976 | Reimann et al. |
| 3,971,906 | A | 7/1976 | Sahrbacker |
| 4,002,874 | A | 1/1977 | Brown |
| 4,016,490 | A | 4/1977 | Weckenmann et al. |
| 4,018,392 | A | 4/1977 | Wagner |
| 4,062,282 | A | 12/1977 | Miller et al. |
| 4,068,805 | A | 1/1978 | Oswald |
| 4,082,232 | A | 4/1978 | Brewer |
| 4,107,484 | A | 8/1978 | Petersen, III |
| 4,117,752 | A | 10/1978 | Yoneda |
| 4,125,228 | A | 11/1978 | Brewer |
| 4,135,068 | A | 1/1979 | Burns |
| 4,162,042 | A | 7/1979 | Mommsen et al. |
| 4,172,400 | A | 10/1979 | Brierley |
| 4,180,716 | A | 12/1979 | Suzuki |
| 4,187,420 | A | 2/1980 | Piber |
| 4,194,698 | A | 3/1980 | Kosmowski |
| 4,262,179 | A | 4/1981 | Bauer |
| 4,276,459 | A | 6/1981 | Willett et al. |
| 4,277,666 | A | 7/1981 | Vignaud |
| 4,349,814 | A | 9/1982 | Akehurst |
| 4,423,844 | A | 1/1984 | Sours et al. |
| 4,449,062 | A | 5/1984 | Wilson |
| 4,471,915 | A | 9/1984 | Levin et al. |
| 4,510,860 | A | 4/1985 | LaBarge et al. |
| 4,518,958 | A | 5/1985 | Cook et al. |
| 4,549,097 | A | 10/1985 | Ulmer |
| 4,562,971 | A | 1/1986 | Schwelling |
| 4,564,146 | A | 1/1986 | Bleasdale |
| 4,598,182 | A | 7/1986 | Breslin |
| 4,664,317 | A | 5/1987 | Morton |
| 4,673,136 | A | 6/1987 | Bainco et al. |
| 4,683,381 | A | 7/1987 | Dufoug |
| 4,693,428 | A | 9/1987 | Raterman et al. |
| 4,706,895 | A | 11/1987 | Bricker |
| 4,709,197 | A | 11/1987 | Goldhammer et al. |
| 4,713,509 | A | 12/1987 | Chebowski |
| 4,751,603 | A | 6/1988 | Kwan |
| 4,753,323 | A | 6/1988 | Kahkipuro |
| 4,767,895 | A | 8/1988 | Parrish |
| 4,771,359 | A | 9/1988 | Link |
| 4,784,601 | A | 11/1988 | Nitta |
| 4,784,602 | A | 11/1988 | Nitta |
| 4,798,116 | A | 1/1989 | Silver et al. |
| 4,821,967 | A | 4/1989 | Moriyama |
| 4,824,029 | A | 4/1989 | Stottmann et al. |
| 4,839,533 | A | 6/1989 | Aga |
| 4,859,172 | A | 8/1989 | Nitta |
| 4,882,458 | A | 11/1989 | Berg et al. |
| 4,893,027 | A | 1/1990 | Kammerer et al. |
| 4,900,881 | A | 2/1990 | Fisher |
| 4,910,365 | A | 3/1990 | Kuo |
| 4,944,462 | A | 7/1990 | Raterman et al. |
| 4,982,058 | A | 1/1991 | Schroeder et al. |
| 5,037,033 | A | 8/1991 | Stottmann et al. |
| 5,044,270 | A | 9/1991 | Schwelling |
| 5,045,648 | A | 9/1991 | Fogleman, Sr. |
| 5,065,947 | A | 11/1991 | Farnsworth |
| 5,081,406 | A | 1/1992 | Hughes et al. |
| 5,100,067 | A | 3/1992 | Konig et al. |
| 5,135,178 | A | 8/1992 | Strohmeyer |
| 5,166,679 | A | 11/1992 | Vranish et al. |
| 5,167,374 | A | 12/1992 | Strohmeyer |
| 5,171,143 | A | 12/1992 | Sohn |
| 5,186,398 | A | 2/1993 | Vigneaux |
| 5,207,392 | A | 5/1993 | Stangenberg et al. |
| 5,236,138 | A | 8/1993 | Stangenberg et al. |
| 5,268,553 | A | 12/1993 | Shimoji |
| 5,269,473 | A | 12/1993 | Strohmeyer et al. |
| 5,275,342 | A | 1/1994 | Galanty |
| 5,279,467 | A | 1/1994 | Lydy |
| 5,295,633 | A | 3/1994 | Kimbro et al. |
| 5,318,229 | A | 6/1994 | Brown |
| D348,431 | S | 7/1994 | Hofmann |
| 5,345,138 | A | 9/1994 | Mukaidono |
| 5,356,286 | A | 10/1994 | Sher |
| 5,397,890 | A | 3/1995 | Schueler et al. |
| 5,407,346 | A | 4/1995 | Sher |
| 5,421,720 | A | 6/1995 | Sher |
| 5,432,308 | A | 7/1995 | Howie, Jr. |
| 5,436,613 | A | 7/1995 | Ghosh |
| 5,460,516 | A | 10/1995 | Sher |
| 5,494,229 | A | 2/1996 | Rokos et al. |
| 5,568,895 | A | 10/1996 | Webb et al. |
| 5,607,295 | A | 3/1997 | Khemarangsan |
| 5,621,290 | A | 4/1997 | Heller et al. |
| 5,636,801 | A | 6/1997 | Kroger |
| 5,655,725 | A | 8/1997 | Kroger |
| 5,662,280 | A | 9/1997 | Nishio et al. |
| 5,667,152 | A | 9/1997 | Mooring |
| 5,680,999 | A | 10/1997 | Wada |
| 5,704,776 | A | 1/1998 | Sher |
| 5,724,737 | A | 3/1998 | Stones |
| 5,775,605 | A | 7/1998 | Tsai |
| 5,788,476 | A | 8/1998 | Sher |
| 5,829,697 | A | 11/1998 | Kroger |
| 5,829,963 | A | 11/1998 | Ichikawa |
| 5,850,342 | A | 12/1998 | Nakamura et al. |
| 5,868,242 | A | 2/1999 | Hall et al. |
| 5,884,855 | A | 3/1999 | Chang |
| 5,897,065 | A | 4/1999 | Schwelling |
| 5,921,367 | A | 7/1999 | Kashioka et al. |
| D412,716 | S | 8/1999 | Kroger |
| 5,942,975 | A | 8/1999 | S.o slashed.rensen |
| 5,988,542 | A | 11/1999 | Henreckson et al. |
| 6,065,696 | A | 5/2000 | Tsai |
| 6,079,645 | A | 6/2000 | Henreckson et al. |
| 6,082,643 | A | 7/2000 | Kovacs |
| 6,082,644 | A | 7/2000 | Turner |
| 6,089,482 | A | 7/2000 | Chang |
| 6,113,017 | A | 9/2000 | Tsai |
| 6,116,528 | A | 9/2000 | Schwelling |
| 6,247,828 | B1 | 6/2001 | Herst |
| D444,809 | S | 7/2001 | Chang |
| 6,260,780 | B1 | 7/2001 | Kroger et al. |
| 6,265,682 | B1 | 7/2001 | Lee |
| 6,274,828 | B1 | 8/2001 | Chu |
| 6,308,904 | B1 | 10/2001 | Chang |
| 6,325,309 | B1 | 12/2001 | Chang |
| 6,340,124 | B1 | 1/2002 | Charles et al. |
| 6,376,939 | B1 | 4/2002 | Suzuki et al. |
| 6,418,004 | B1 | 7/2002 | Mather et al. |
| 6,501,198 | B2 | 12/2002 | Taylor et al. |
| 6,536,536 | B1 | 3/2003 | Gass et al. |
| 6,550,701 | B1 | 4/2003 | Chang |
| 6,575,285 | B2 | 6/2003 | Jong |
| D481,416 | S | 10/2003 | Chang |
| 6,629,654 | B2 | 10/2003 | Neely et al. |
| 6,655,943 | B1 | 12/2003 | Peterson et al. |
| 6,676,050 | B2 | 1/2004 | Chang |
| 6,676,460 | B1 | 1/2004 | Motsenbocker |
| 6,724,324 | B1 | 4/2004 | Lambert |
| D494,607 | S | 8/2004 | Hunag |
| 6,775,018 | B1 | 8/2004 | Taniguchi |
| 6,779,747 | B2 | 8/2004 | McLean et al. |
| 6,813,983 | B2 | 11/2004 | Gass et al. |
| 6,822,698 | B2 | 11/2004 | Clapper |
| 6,826,988 | B2 | 12/2004 | Gass et al. |
| 6,834,730 | B2 | 12/2004 | Gass et al. |
| 6,857,345 | B2 | 2/2005 | Gass et al. |
| D502,713 | S | 3/2005 | Hunag |
| D502,714 | S | 3/2005 | Hunag |
| 6,877,410 | B2 | 4/2005 | Gass et al. |
| 6,880,440 | B2 | 4/2005 | Gass et al. |
| 6,920,814 | B2 | 7/2005 | Gass et al. |

| | | | |
|---|---|---|---|
| 6,922,153 | B2 | 7/2005 | Pierga et al. |
| 6,945,148 | B2 | 9/2005 | Gass et al. |
| 6,945,149 | B2 | 9/2005 | Gass et al. |
| 6,957,601 | B2 | 10/2005 | Gass et al. |
| 6,962,301 | B1 | 11/2005 | Chang |
| 6,966,513 | B2 | 11/2005 | Chang |
| 6,976,648 | B2 | 12/2005 | Chang |
| 6,978,954 | B2 | 12/2005 | Kroeger |
| 6,979,813 | B2 | 12/2005 | Avril |
| 6,981,667 | B2 | 1/2006 | Hunag |
| 6,983,903 | B2 | 1/2006 | Chang |
| 6,994,004 | B2 | 2/2006 | Gass et al. |
| 6,997,090 | B2 | 2/2006 | Gass et al. |
| 7,000,514 | B2 | 2/2006 | Gass et al. |
| 7,024,975 | B2 | 4/2006 | Gass et al. |
| 7,040,559 | B2 | 5/2006 | Matlin et al. |
| 7,044,410 | B2 | 5/2006 | Hunag |
| 7,048,218 | B2 | 5/2006 | Hunag |
| 7,055,417 | B1 | 6/2006 | Gass |
| 7,077,039 | B2 | 7/2006 | Gass et al. |
| 7,083,129 | B2 | 8/2006 | Beam |
| 7,093,668 | B2 | 8/2006 | Gass et al. |
| 7,098,800 | B2 | 8/2006 | Gass |
| 7,100,483 | B2 | 9/2006 | Gass et al. |
| 7,121,358 | B2 | 10/2006 | Gass et al. |
| 7,137,326 | B2 | 11/2006 | Gass et al. |
| 7,150,422 | B2 | 12/2006 | Wang |
| 7,171,879 | B2 | 2/2007 | Gass et al. |
| 7,171,897 | B2 | 2/2007 | Barajas et al. |
| 7,195,185 | B2 | 3/2007 | Matlin |
| 7,197,969 | B2 | 4/2007 | Gass et al. |
| 7,210,383 | B2 | 5/2007 | Gass et al |
| 7,225,712 | B2 | 6/2007 | Gass et al. |
| 7,228,772 | B2 | 6/2007 | Gass |
| 7,231,856 | B2 | 6/2007 | Gass et al. |
| 7,284,467 | B2 | 10/2007 | Gass et al. |
| 7,290,472 | B2 | 11/2007 | Gass et al. |
| 7,308,843 | B2 | 12/2007 | Gass et al. |
| 7,311,276 | B2 | 12/2007 | Matlin et al. |
| 7,328,752 | B2 | 2/2008 | Gass et al. |
| 7,344,096 | B2 | 3/2008 | Matlin et al. |
| D583,859 | S | 12/2008 | Holderfield |
| D584,342 | S | 1/2009 | Parratt |
| D591,335 | S | 4/2009 | Holderfield et al. |
| 7,631,822 | B2 | 12/2009 | Matlin et al. |
| 7,631,823 | B2 | 12/2009 | Matlin et al. |
| 7,631,824 | B2 | 12/2009 | Matlin et al. |
| 7,635,102 | B2 | 12/2009 | Matlin et al. |
| 2001/0030114 | A1 | 10/2001 | Thielman |
| 2002/0002942 | A1 | 1/2002 | Abraham et al. |
| 2002/0017175 | A1 | 2/2002 | Gass et al. |
| 2002/0017176 | A1 | 2/2002 | Gass et al. |
| 2002/0017178 | A1 | 2/2002 | Gass et al. |
| 2002/0017179 | A1 | 2/2002 | Gass et al. |
| 2002/0017180 | A1 | 2/2002 | Gass et al. |
| 2002/0017181 | A1 | 2/2002 | Gass et al. |
| 2002/0017182 | A1 | 2/2002 | Gass et al. |
| 2002/0017183 | A1 | 2/2002 | Gass et al. |
| 2002/0017184 | A1 | 2/2002 | Gass et al. |
| 2002/0017336 | A1 | 2/2002 | Gass et al. |
| 2002/0020261 | A1 | 2/2002 | Gass et al. |
| 2002/0020263 | A1 | 2/2002 | Gass et al. |
| 2002/0020265 | A1 | 2/2002 | Gass et al. |
| 2002/0056348 | A1 | 5/2002 | Gass et al. |
| 2002/0056349 | A1 | 5/2002 | Gass et al. |
| 2002/0056350 | A1 | 5/2002 | Gass et al. |
| 2002/0059853 | A1 | 5/2002 | Gass et al. |
| 2002/0059854 | A1 | 5/2002 | Gass et al. |
| 2002/0059855 | A1 | 5/2002 | Gass et al. |
| 2002/0066346 | A1 | 6/2002 | Gass et al. |
| 2002/0069734 | A1 | 6/2002 | Gass et al. |
| 2002/0111702 | A1 | 8/2002 | Angel |
| 2002/0170399 | A1 | 11/2002 | Gass et al. |
| 2002/0170400 | A1 | 11/2002 | Gass |
| 2002/0190581 | A1 | 12/2002 | Gass et al. |
| 2003/0002942 | A1 | 1/2003 | Gass et al. |
| 2003/0005588 | A1 | 1/2003 | Gass et al. |
| 2003/0015253 | A1 | 1/2003 | Gass et al. |
| 2003/0019341 | A1 | 1/2003 | Gass et al. |
| 2003/0037651 | A1 | 2/2003 | Gass et al. |
| 2003/0056853 | A1 | 3/2003 | Gass et al. |
| 2003/0058121 | A1 | 3/2003 | Gass et al. |
| 2003/0090224 | A1 | 5/2003 | Gass et al. |
| 2003/0090226 | A1 | 5/2003 | Chen et al. |
| 2003/0196824 | A1 | 10/2003 | Gass et al. |
| 2004/0008122 | A1 | 1/2004 | Michael |
| 2004/0040426 | A1 | 3/2004 | Gass et al. |
| 2004/0043696 | A1 | 3/2004 | Suzuki |
| 2004/0163514 | A1 | 8/2004 | Gass et al. |
| 2004/0173430 | A1 | 9/2004 | Gass |
| 2004/0194594 | A1 | 10/2004 | Dils et al. |
| 2004/0226800 | A1 | 11/2004 | Pierga et al. |
| 2005/0039586 | A1 | 2/2005 | Gass et al. |
| 2005/0039822 | A1 | 2/2005 | Gass et al. |
| 2005/0041359 | A1 | 2/2005 | Gass |
| 2005/0132859 | A1 | 6/2005 | Hunag |
| 2005/0157203 | A1 | 7/2005 | Nakakuki et al. |
| 2005/0166736 | A1 | 8/2005 | Gass et al. |
| 2005/0218250 | A1 | 10/2005 | Matlin et al. |
| 2005/0236502 | A1 * | 10/2005 | Anderson et al. ........ 241/46.013 |
| 2005/0274834 | A1 | 12/2005 | Huang |
| 2005/0274836 | A1 | 12/2005 | Chang |
| 2006/0091247 | A1 | 5/2006 | Matlin |
| 2006/0157600 | A1 | 7/2006 | Wang |
| 2006/0169619 | A1 | 8/2006 | Wang |
| 2006/0249609 | A1 | 11/2006 | Huang |

FOREIGN PATENT DOCUMENTS

| | | |
|---|---|---|
| CN | 2383583 | 6/2000 |
| DE | 733413 | 3/1943 |
| DE | 7818838 | 11/1979 |
| DE | 3247299 | 7/1984 |
| DE | 3313232 | 10/1984 |
| DE | 3208676 | 4/1986 |
| DE | 3540896 | 5/1987 |
| DE | 8619856 | 9/1988 |
| DE | 8619856.4 | 10/1988 |
| DE | 3819285 | 12/1989 |
| DE | 4014669 | 11/1991 |
| DE | 4121330 | 1/1993 |
| DE | 19519858 | 5/1996 |
| DE | 19703575 | 8/1998 |
| DE | 19960267 | 7/2000 |
| EP | 0191137 | 8/1986 |
| EP | 0511535 | 4/1992 |
| EP | 00522071 | 5/1993 |
| EP | 0562076 | 9/1993 |
| EP | 0736886 | 10/1996 |
| EP | 855221 | 7/1998 |
| EP | 0855221 | 7/1998 |
| EP | 1069954 | 1/2001 |
| EP | 1195202 | 4/2002 |
| EP | 1442834 | 4/2004 |
| GB | 2096919 | 10/1982 |
| GB | 2199962 | 7/1988 |
| GB | 2203063 | 10/1988 |
| GB | 2234690 | 2/1991 |
| JP | 52011691 | 1/1977 |
| JP | 57076734 | 5/1982 |
| JP | 62146877 | 6/1987 |
| JP | 3143552 | 6/1991 |
| JP | 4110143 | 4/1992 |
| JP | 03143552 | 5/1992 |
| JP | 04110143 | 5/1992 |
| JP | 04157093 | 5/1992 |
| JP | 04180852 | 6/1992 |
| JP | 05014164 | 1/1993 |
| JP | 05068906 | 3/1993 |
| JP | 05092144 | 4/1993 |
| JP | 05123593 | 5/1993 |
| JP | 05211691 | 8/1993 |
| JP | 05280243 | 10/1993 |
| JP | 06137104 | 5/1994 |
| JP | 06277548 | 10/1994 |
| JP | 07039778 | 5/1995 |
| JP | 07136539 | 5/1995 |
| JP | 07155629 A2 | 6/1995 |
| JP | 07157012 A2 | 6/1995 |

| | | | |
|---|---|---|---|
| JP | 07299377 | A2 | 11/1995 |
| JP | 07328469 | A2 | 12/1995 |
| JP | 8001026 | | 1/1996 |
| JP | 09070551 | A2 | 3/1997 |
| JP | 09075763 | A2 | 3/1997 |
| JP | 09139161 | A2 | 5/1997 |
| JP | 09262491 | A2 | 10/1997 |
| JP | 10-048344 | | 2/1998 |
| JP | 10034003 | A2 | 2/1998 |
| JP | 10-089592 | | 4/1998 |
| JP | 11216383 | A2 | 8/1999 |
| JP | 20076014 | | 3/2000 |
| JP | 20346288 | | 12/2000 |
| JP | 2001150383 | A2 | 6/2001 |
| JP | 2001-349139 | | 12/2001 |
| JP | 21349139 | | 12/2001 |
| JP | 24321993 | | 11/2004 |
| JP | 200432199 | A2 | 11/2004 |
| JP | 26075831 | | 3/2006 |
| JP | 2007-075822 | | 3/2007 |
| JP | 27075822 | | 3/2007 |
| WO | WO8403650 | | 9/1984 |
| WO | WO9101860 | | 2/1991 |
| WO | WO92/000159 | | 1/1992 |
| WO | WO9306570 | | 4/1993 |
| WO | WO94/013441 | | 6/1994 |
| WO | WO9413441 | | 6/1994 |
| WO | WO9308356 | | 4/1996 |
| WO | WO9613362 | | 5/1996 |
| WO | WO9637350 | | 11/1996 |
| WO | WO9852728 | | 11/1998 |
| WO | WO0048283 | | 8/2000 |
| WO | WO02060588 | | 8/2002 |
| WO | WO2002/082613 | | 10/2002 |
| WO | WO2003/006213 | | 1/2003 |
| WO | WO2005-084861 | | 9/2005 |
| WO | WO2005097331 | | 10/2005 |
| WO | WO2005107951 | | 11/2005 |
| WO | WO2006049784 | | 1/2006 |
| WO | PCT/US2005/028290 | | 3/2006 |
| WO | WO2006/031324 | | 3/2006 |
| WO | WO2006031324 | | 3/2006 |
| WO | WO2006074122 | | 7/2006 |
| WO | WO2007/060698 | | 5/2007 |
| WO | WO2007/109753 | | 9/2007 |
| WO | WO2008/011517 | | 1/2008 |
| WO | WO2008/014276 | | 1/2008 |
| WO | WO2008/042538 | | 4/2008 |
| WO | WO2008/064392 | | 6/2008 |

OTHER PUBLICATIONS

Industrial Guarding Program Energy Sources Machinery Equipment and Materials, OFSWA Sep. 2002 Version1.0.

Navigating the maze of proximit sensor selection, Allen-Bradley, Sensors Today, vol. 2 Issue 1, 1999.

The Limitations of Radiofrequency Presence Sensing Device, US Dept. of Labor, OSHA, Sep. 21, 1987.

Charge-Transfer Touch Sensor, Quantum Research Group Ltd, 2001.

Safety Mats, Presence Sensing Safety Devices, Allen-Bradley, 2-72.

Tom Begnal, Sawstop and bandsaws might soon be an option, Taunton 2008.

Safeguarding woodworking machines and worker safety, tablesaw blade safety device, WOODWEB forum, 2008.

Nils Karlsson, Theory and application of a capacitive sensor for safeguarding in industry, Dept. of Physics and Measurement Technology, Mar. 1994.

J.L. Novak & J.T. Feddema, a capacitance-based proximity sensor for whole arm obstacle avoidance, Sandia National Laboratories Albuquerque NM 87185, Dec. 1992.

D.S. Chauhan & P.H. Dehoff, a magneto-sensitive skin for robots in space, Dept. of Mechanical Engineering & Engineering Science University of North Carolina at Charlotte, Jul. 1991.

Thomas G. Zimmerman et al., applying electric field sensing to human-computer interfaces, MIT Media Laboratory Physics and Media Group May 1995.

Proximity Sensors (book), Festo Didactic, Germany 2003.

Lennart Bavall & Nils Karlsson, capacitive detection of humans for safety in industry- a numerical and experimental investigation. Linkoping Institute of Tech., Sweden Oct. 1997.

concepts and techniques of machine safeguarding, US Dept. of Labor, OSHA 3067, 1992.

Designing a safe highly productive system, thefabricator.com, May 30, 2002.

Joshua Smith et al., Electric Field Sensing for graphical interfaces, May/Jun. 1998.

TI's Digital signal Controllers put brake on sawstop table saw, www.embeddedstar.com, 2005.

Doubled productivity reduced product damage, Gorbel Inc., 2003.

* cited by examiner

PAPER SHREDDER CONTROL SYSTEM RESPONSIVE TO TOUCH-SENSITIVE ELEMENT

CROSS-REFERENCE TO RELATED PATENTS AND APPLICATIONS

This U.S. Patent Application claims priority to, and is a Continuation-in-Part of, co-pending U.S. patent application Ser. No. 12/576,493, entitled “Touch-Sensitive Paper Shredder Control System,” filed on Oct. 9, 2009, which is a Continuation of U.S. Pat. No. 7,622,831, entitled “Touch-Sensitive Paper Shredder Control System,” filed on Jul. 12, 2007 and issued on Nov. 24, 2009, which is a Continuation-in-Part of U.S. Pat. No. 7,471,017, which Patent being filed on Aug. 30, 2006 and issued on Dec. 30, 2008, with each Application and Patents being of the same inventor hereof, and each being assigned to the same Assignee hereof, and with each Application and Patents being respectively incorporated by reference in their entirety.

FIELD OF THE INVENTION

This invention is related to office equipment and the safe control of paper shredders, in particular touch-sensitive paper shredder control systems, responsive to a touch of a shredder blade.

BACKGROUND OF THE INVENTION

Automated office appliances have proliferated in modern life and workspaces, and one of the most common appliances are paper shredders. Currently, paper shredders have entered into homes, some of them with automatic sensors. The sensors may be configured to detect objects inserted therein and signal the paper shredder to begin to work by grabbing the object and shredding them. Unless the paper shredder is turned off, the shredder may always be in stand-by mode. However, because paper shredders are destructive devices, if human users are not careful when using them, an injury may occur. Many current paper shredders do not have protective devices to prevent objects or body parts from entering into the throat of the shredder—potentially bringing a safety hazard into the office or home.

Among the present day paper shredders, there have been shredders using the technology of contact detection to stop the shredder’s blades from injuring a person or pet. Referring to FIG. 1, the circuit shown therein is an example of this technology. SW2 is a polarity conversion switch and it can exchange the hot lead and ground lead of the AC power. Resistors R12 and R13, capacitors C3 and C2, and diodes D11, D12, D13, D14, D15 and D6 comprise a 24V power supply for the relay. Diode D6, D7, and capacitor C1 comprise a power supply for U1, the voltage detection integrated circuit. The positive terminal of the power supply is the hot line of the AC power. Relay switch RLY-1, diode D2, transistor Q1, resistors R5, R27, and R6, and optical coupler U5 comprise a power supply for the equipment. Diodes D1, D8 and D21, thermal control lamp (orange), transistor Q4, resistors R4, R14, and R11, and motor thermal control switch comprise a thermal control indication circuit. Fuse F1, switch RLY1, motor, function switch, and motor thermal control switch comprise a motor operation circuit. The rotation direction is determined by the function switch setting. Power supply, resistors R7, R1, R9, R2, R8 and R10, diodes D20, D16, D4, D5, D9 and D10, transistors Q2 and Q3, and pin 5 of the voltage detection integrated circuit comprise a LED indication circuit. The metal part of the panel, resistors R20, R19, R21 and R22, capacitor C8, and diodes D19 and D17 comprise a touch detection circuit.

When the function switch is set at the “off” position, the machine is not working. When the function switch is set at other positions and the wastepaper basket is separated from the machine, the machine is on but not capable of cutting paper. When the basket is detached from the machine body, the spring switch is open to cut power to the motor. The operation of the circuit for the breaking of the spring is as follows: pin 1 of U1 detects the break of the spring, pin 5 of U1 becomes “high”, Q3 and Q2 cutoff and the motor doesn’t turn. The power indicator and touch/basket detach indicator are on because these two indicators, R7, R8, D9, and the motor thermal control switch form a current loop.

When the function switch is moved away from “off”, and the wastepaper basket is in position, the machine is ready to work. The sequence of circuit operation is as follows: pin 1 of U1 becomes “low” and Q3 and Q2 become conducting. At the same time, pin 6 of U1 becomes “low”, Q1 is on, and the relay RLY 1 is closed. Now if the function switch is set at “on”, the machine will cut the paper if there is paper in the throat, otherwise the shredder is on standby. Under these circumstances, if hands, metal, or living animals contact the metal part at the feed throat, AC power, circuit elements (R21, R19, R20,) and the contact will form a circuit, and turn off the motor because pin 8 of U1 now is “low” and pin 5 and 6 of U1 are “high”. To be more specific, as pin 6 of U1 is “high”, Q1 is off and the motor power is turned off. As pin 5 of U1 is “high” and Q2 and Q3 are cut off, the touch protection indicator is on. After the contact is removed from the feed throat, the shredder returns to normal operation.

The touch protection is achieved through the installment of conductive touch panel at the paper intake. When touching the conductive panel, the conductivity of human body provides a faint signal to the control circuit to activate the touch protection. In this case, two 2.2M ohm resistors largely decrease the current that flows through the human body and thus the circuit may not harm a human. By using this technique, a sensitive voltage detection integrated circuit is needed to monitor the status of the touch panel in real time. Thus the demand for a highly stable and sensitive integrated circuit is apparent. Circuit aging caused by long-term usage will also diminish or even cut the circuit’s detection capability. As for the two resistors with high values, they limit the current that may flow through the human body, but they may also lose their capability in a humid environment. Moreover, a human may come in direct contact with AC power, causing electric shock or even endangering life.

SUMMARY OF THE INVENTION

The present invention solves the above-mentioned shortcomings by providing a touch-sensitive paper shredder control system making use of bioelectricity. The control process is safe and sensitive. The circuit is stable in performance, and can be applied in a wide degree of situations. To meet the above objectives, the touching device for paper shredders is constructed as below.

The touch-sensitive paper shredder control system may include a function module, power supply module, conductive touch panel, and a shredder mechanical component. The function module may include a touch detection circuit unit, motor reversal detection circuit unit, paper intake detection circuit unit, overload protection circuit unit, control circuit unit, and function switch having on, off, and reverse positions. All units in the function module may be connected directly to the control circuit unit except for the function switch, which, together with the control circuit unit, controls the motor driving circuit unit, and thus the shredder's mechanical components.

The power supply module may include an AC power interface switch, safety switch, fuse, control switch, power supply of control circuit unit, and motor driving circuit unit. The AC power interface switch, safety switch, fuse, and control switch may be connected in series and, through the control of the function switch, connect to the motor driving circuit unit. The control switch is a relay switch. The AC power, which flows through the fuse, is rectified, filtered and regulated to provide DC power to all circuit units.

The conductive touch panel may be connected to the touch detection circuit unit. The touch detection circuit unit consists of a bioelectricity controlled switching circuit and a ground switch circuit. The bioelectricity controlled switching circuit may be a transistor circuit with a first transistor where the touch panel is connected to the base of the first transistor via a first resistor. The base of the first transistor is also connected to ground via a parallel combination of a second resistor and a first capacitor. The emitter of the first transistor is connected to ground via a parallel combination of a third resistor and a second capacitor, and is also connected to the input of the ground switch circuit.

The collector of the first transistor drives in parallel, a power indicator LED and a touch indicator LED and is then connected to the power supply. The ground switching circuit is also a transistorized switching circuit having a second transistor. The base of the second transistor is connected to the output of the bioelectricity controlled switching circuit, the emitter is grounded, and the collector is connected to the input of the control circuit unit via an optical coupler and to the power supply via a fourth resistor.

The paper intake detection circuit unit is connected to the control circuit unit also. The paper intake detection circuit unit comprises a light emitting diode and a photosensitive diode. The emitting area of the former and the optics sensing part of the latter face each other and are installed on the walls of opposite sides of the feed throat. The overload protection circuit and the motor reversal detection circuit unit are connected to the control circuit unit.

The touch-sensitive paper shredder control system has adopted cascaded circuits to ensure human safety when a human touches the conductive touch panel. The electricity from the human body enables the bioelectricity controlled switching circuit, and then all the connected circuits. The control circuit unit disables the mechanical part of the shredder and it ensures human safety. Even if the power switch is turned on, the mechanical part of the shredder still doesn't work. The shredder realizes real time monitoring. The complete control process is both safe and sensitive. The machine performance is stable and reliable and easy to operate without human oversight.

In other embodiments of the touch-sensitive paper shredder control system, a shredder blade is configured to be sensitive to bioelectricity from a living being. When the bioelectricity is detected at the shredder blade, a control system responds by actuating a restraint to a shredder mechanical part, essentially halting a shredder blade. In yet other embodiments, the shredder motor is de-energized prior to actuating a restraint, reducing torque on driving and driven mechanical elements during deceleration of the shredder blade.

BRIEF DESCRIPTION OF THE DRAWINGS

The invention is generally shown by way of reference to the accompanying drawings in which.

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention.

DETAILED DESCRIPTION OF THE INVENTION

Figure 1:
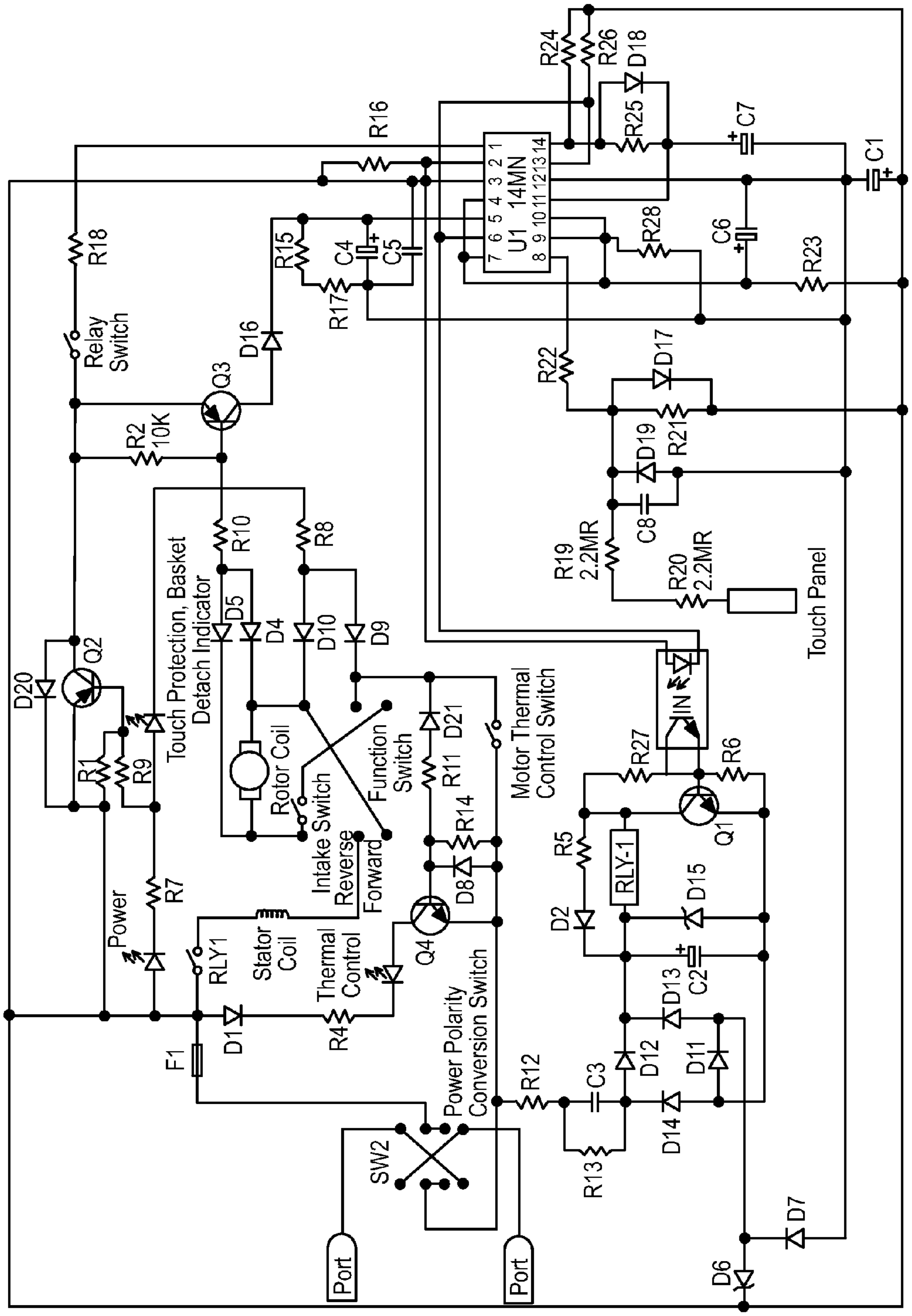
FIG. 1 is a circuit diagram illustrating the electrical components of a shredder control system using prior art technology.
Figure 2:
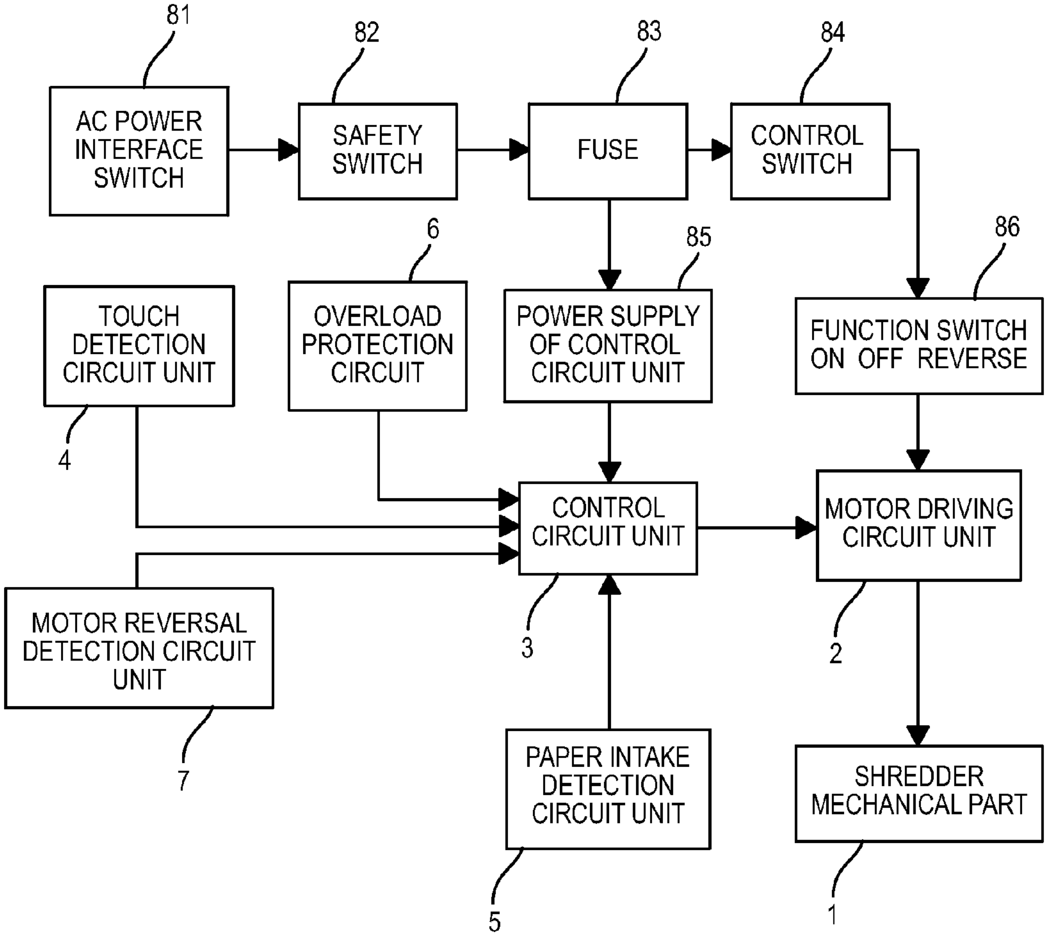
FIG. 2 is a block diagram of the components and modules within a touch-sensitive paper shredder control system of the present invention.

In one embodiment, the touch-sensitive paper shredder control system may include the following components: a function module, a power supply module, and shredder mechanical parts. Referring to FIG. 2, the function module consists of a touch detection circuit unit 4, motor reversal detection circuit unit 7, paper intake detection circuit unit 5, overload protection circuit 6, control circuit unit 3, and function switch 86. All of these units are connected directly to control circuit unit except for the function switch, which together with the control circuit unit controls the motor driving circuit unit 2, and then the shredder mechanical part 1. A conductive touch panel is connected to the touch detection circuit unit, which consists of a bioelectricity controlled switching circuit and a ground switching circuit.

The power supply module consists of an AC power interface unit 81, security switch 82, fuse 83, control switch 84, power supply of control circuit unit 85, and the motor driving circuit unit 2. The control switch is a relay switch, and the security switch is a door switch. The first four of the above-mentioned units are connected in series and, through the control of function switch 86, connected to motor driving circuit unit. The power, through the fuse, is connected to the power supply of control circuit unit, and then to the control circuit unit.

Figure 3:
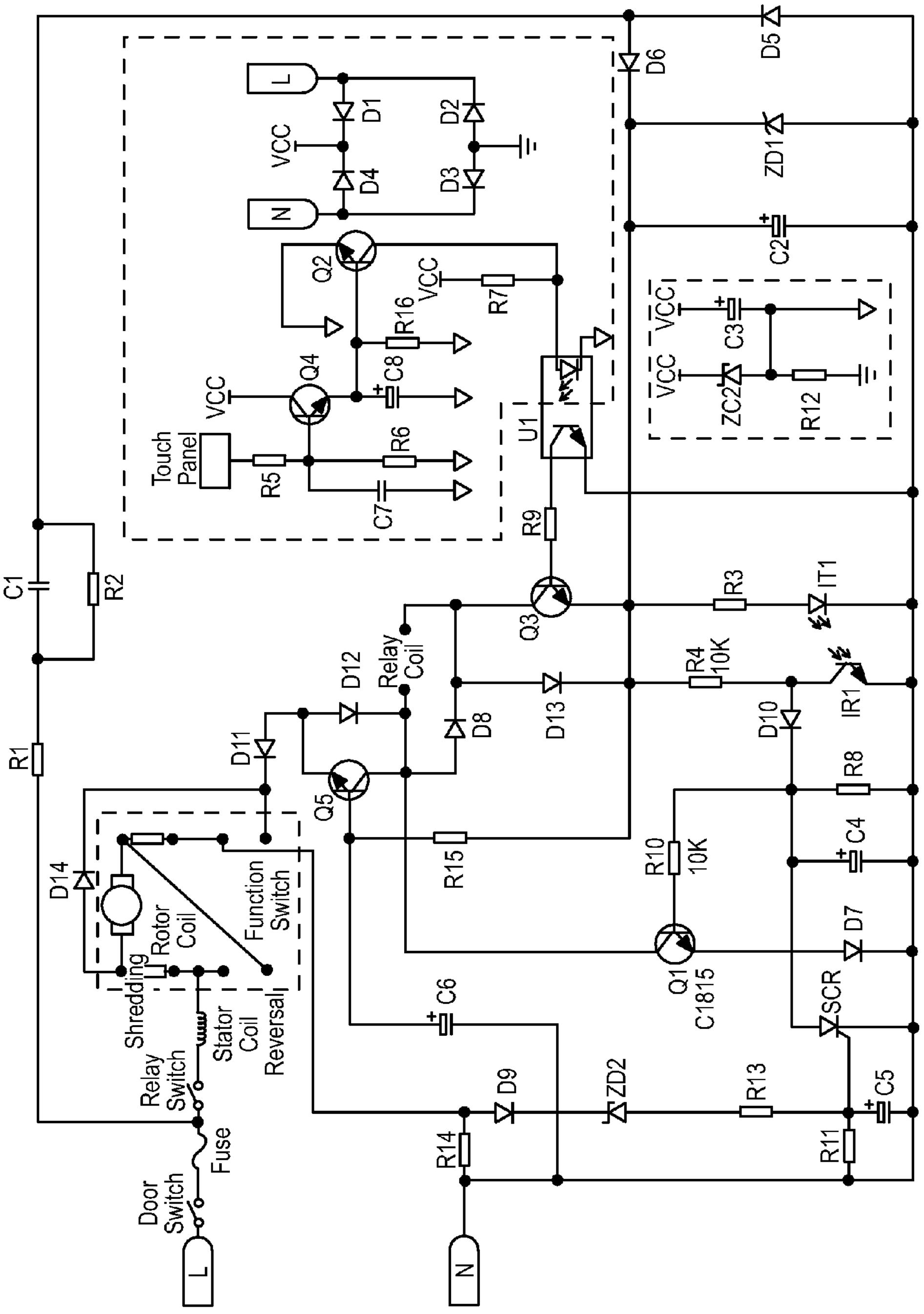
FIG. 3 is a circuit diagram of the electrical components of a touch-sensitive paper shredder control system of the present invention.

Turning to FIG. 3, in one embodiment, the bioelectricity controlled switching circuit is mainly a switching transistor circuit. The conductive touch panel is connected to the base of switching transistor Q4 via resistor R5. Transistor Q4 has its base connected to ground through paralleled capacitor C7 and resistor R6, its collector connected directly to power VCC, and its emitter connected to ground through paralleled capacitor C8 and resistor R16. The emitter of Q4 is also connected directly to the ground switching circuit.

The ground switching circuit is also a switching transistor circuit. The output from the bioelectricity controlled switching circuit is connected to the input of the ground switching circuit, i.e. the emitter of transistor Q2. Transistor Q2 has its emitter connected directly to ground, its collector connected to VCC through resistor R7, and its collector connected to the input of control circuit unit through an optical coupler U1.

Figure 4:
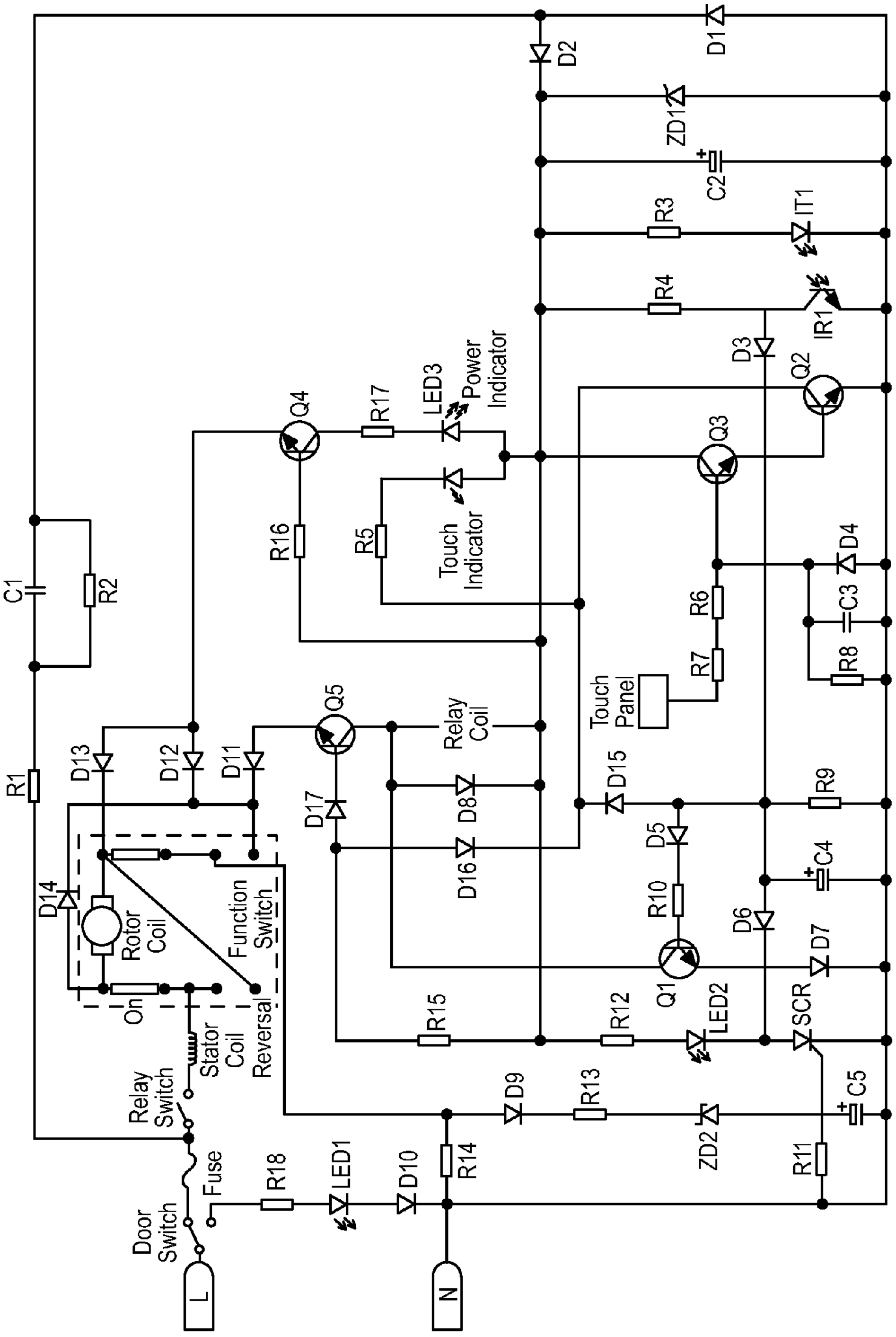
FIG. 4 is the circuit diagram of the electrical components of another embodiment of a touch-sensitive paper shredder control system of the present invention.

Referring to FIG. 4, in another embodiment a bioelectricity controlled switching circuit is based on transistor Q3. The touch panel is connected to the input of the bioelectricity controlled switching circuit, i.e. the base of the switching transistor Q3 through a serial combination of resistors R6 and R7. Transistor Q3 has its base connected to ground via a parallel combination of capacitor C3, diode D4, and resistor R8, the collector is connected to power supply VCC through a parallel combination of power indicator and touch indicator LED3, and the emitter is connected directly to the input of the ground switching circuit.

The ground switching circuit is also a transistor circuit. The output from the bioelectricity controlled switching circuit, i.e. the emitter of transistor Q3, is connected directly to the base of the switching transistor Q2. The emitter of transistor Q2 is connected directly to ground, and the collector is connected to the input of the control circuit unit 3.

Referring to FIG. 2 the paper intake detection circuit unit is connected to the control circuit unit 3. Now turning to FIG. 3, the paper intake detection circuit unit consists of a light emitting diode IT1, and a photosensitive diode IR1 which face each other on opposite positions on the wall of the feed throat of the shredder. Both the overload protection circuit unit 6 and the motor reverse detection circuit unit 7 are connected to the control circuit unit 3 of the touch-sensitive paper shredder.

Referring back to FIG. 2, both the motor reversal detection unit 7 and the paper intake detection unit 5 are connected to control circuit unit 3, then the motor driving circuit unit 2, and then to the shredder mechanical part 1. The motor reversal detection unit 7 detects the reversal signal, sends the electric signal to the control circuit unit 3, then electrically controls the shredder mechanical part 1 to reverse the motor direction through motor driving circuit unit 2. The paper intake detection circuit unit 5 detects the paper insertion at the feed throat, sends the signal to the control circuit unit, and then drives the shredder mechanical part to cut the paper through motor driving circuit unit.

Figure 5:
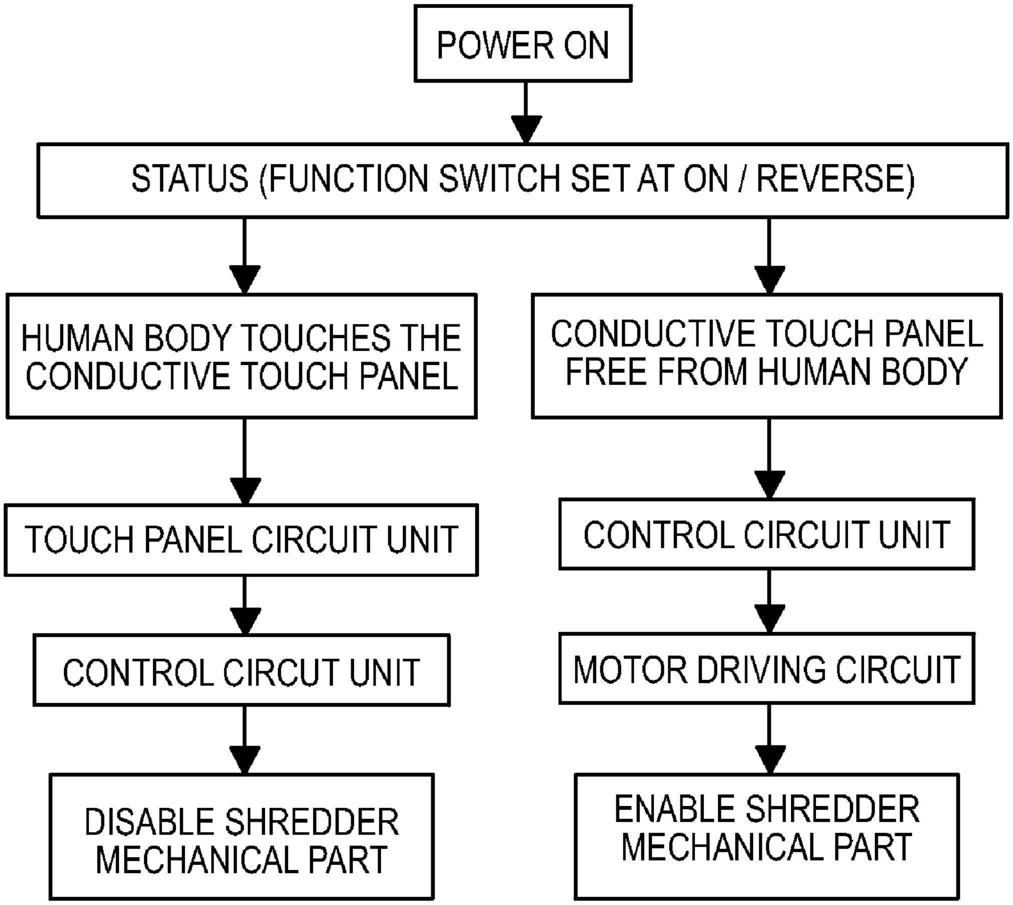
FIG. 5 is a flow chart of the control process used in connection with a touch-sensitive paper shredder control system of the present invention.

Referring now to FIG. 5, during the paper shredding process, if a human body touches the touch panel of the feed throat, the shredder will stop immediately. The touch signal is sent to touch detection circuit unit 4, then goes to control circuit unit 3, and stops the shredder by cutting the power to motor driving circuit unit 2. If a human body doesn't touch the conductive touch panel, the control circuit unit will release the control to motor driving circuit unit 2 to allow the mechanical part to work independently.

Referring back to FIG. 3, the shredder has the following features: overload protection; optics controlled shredding; shredding, shutdown, and reversed rotation functions; and automatic touch-stop.

The power supply of the control circuit unit is described below. AC input power is divided, rectified, regulated, and filtered by the circuit consists of resistors R1 and R2, capacitors C1 and C2, diodes D5 and D6, and Zener diode ZD1. The regulated 24 volts DC power is the power source for the control circuit unit. It's far below the safety voltage to pass through human body and will do no harm to human or animals.

The power supply for the touch detection circuit unit is described below. The AC input power, going through a bridge rectifier, is regulated and filtered to provide 12 volts DC voltage. The circuits consists of diodes D1-D4, Zener diode ZD2, resistor R12 and capacitor C3.

When a human touches the metal panel, the bioelectricity from the human body goes to the base of the transistor Q4 via a 1 MegaOhm resistor. The bioelectricity triggers transistors Q4 and Q2 on, cuts off transistor Q3, and thus cuts the motor power so that the shredder automatically stops when people touch the feed throat.

Referring now to FIG. 4, the shredder in this embodiment has the following features: on-off LED indicator; touch protection LED indicator; overload LED indicator; AC Power indicator; optics controlled shredding; and shredding, shutdown, and reversed rotation function.

The overload protection and door open LED indicating functions are implemented by the circuit consists of R18, R14, R13, R11, and R12, light emitting diodes LED1 and LED2, diodes D10, D9, and D6, Zener diode ZD2, capacitor C5 and silicon controlled rectifier SCR.

The power supply for the control circuit unit includes a circuit consisting of resistors R1 and R2, capacitors C1 and C2, diodes D1 and D2, Zener diode ZD1, and capacitor C2. The same regulated 24 volts DC power is used as the power source for the control circuit unit. It's far below the safety voltage to pass through a human body and will do no harm to human or animals.

The touching function is described below. When human touches the metal panel, the bioelectricity from a human body goes to the base of the transistor Q3 via resistors R6 and R7. The signal triggers Q3 and Q2 on, turns Q1 off, and cuts the power to the motor. The motor stops turning and people are protected. The touch detection circuit unit will be more stable if it uses an independent bridge power supply, and is isolated from the motor by an optical coupler.

When a human touches the panel, the touch of human on the metal part of the panel provides a triggering signal which via base bias circuit, turns Q3 on. The base bias circuit consists of resistors R7, R6 and R8, diode D4, and capacitor C3. With enough forward voltage from a human Q3 and Q2 are both turned on. When Q2 is on, its collector voltage drops and thus it turns on touch indicator via R5, turns off Q5 via D16, and turns off Q1 via D15. If the machine were turning reversely at this moment, Q5 would be on. But because of the touch voltage, Q5 is turned off and so is the motor. The other situation is when the machine is in a shredding state. In this case Q1 would be on to turn the motor in the forward direction. But because of human touch Q1 is turned off and motor is turned off, too. In either case, the machine is shut off to ensure the safety of human.

When a human no longer touches the machine's metal plate, transistor Q3 turns off because there is no trigger voltage and the machine returns to a normal working state. The working principle of the power on indicating circuit is as below. When the machine is in the shredding or reversal state as selected from the function switch, the power on indicator in on and when the machine is in a stopped state, the indicator is off. The indicator circuit includes an indicator lamp, resistors R17 and R16, and transistor Q4. When the machine is in the stop state, the indicator is off because transistor Q4 is not conducting. As for the reversal state, the emitter junction of transistor Q4, diode D12, and function switch complete a circuit and the power on indicator is on. While the machine is in the shredding state, the emitter of Q4, diode D13, and the function switch complete a circuit and the power indicator is on.

Persons with small hands, in particular, toddlers, may have fingers that are capable of circumventing mechanical safety systems of a paper shredder. Accordingly, embodiments of the present invention can encompass a paper shredder safety system that is substantially activated by shredder blade contact. Unlike proximity detectors, which actuate safety measures when a target comes with a predetermined distance of a shredder housing element, a shredder blade contact safety system described here is actuated by target contact with a shredder blade.

In general, when a touch-sensitive shredder blade control system is actuated by shredder blade contact, power is removed from the shredder motor. In particular, when a living being contacts the shredder blade, the bioelectric signal generated by the living being is sensed by a biosensor coupled to a shredder blade. The received bioelectric signal actuates a control circuit unit to cause a safety stop, in which at least the shredder motor is de-energized.

Figure 6:
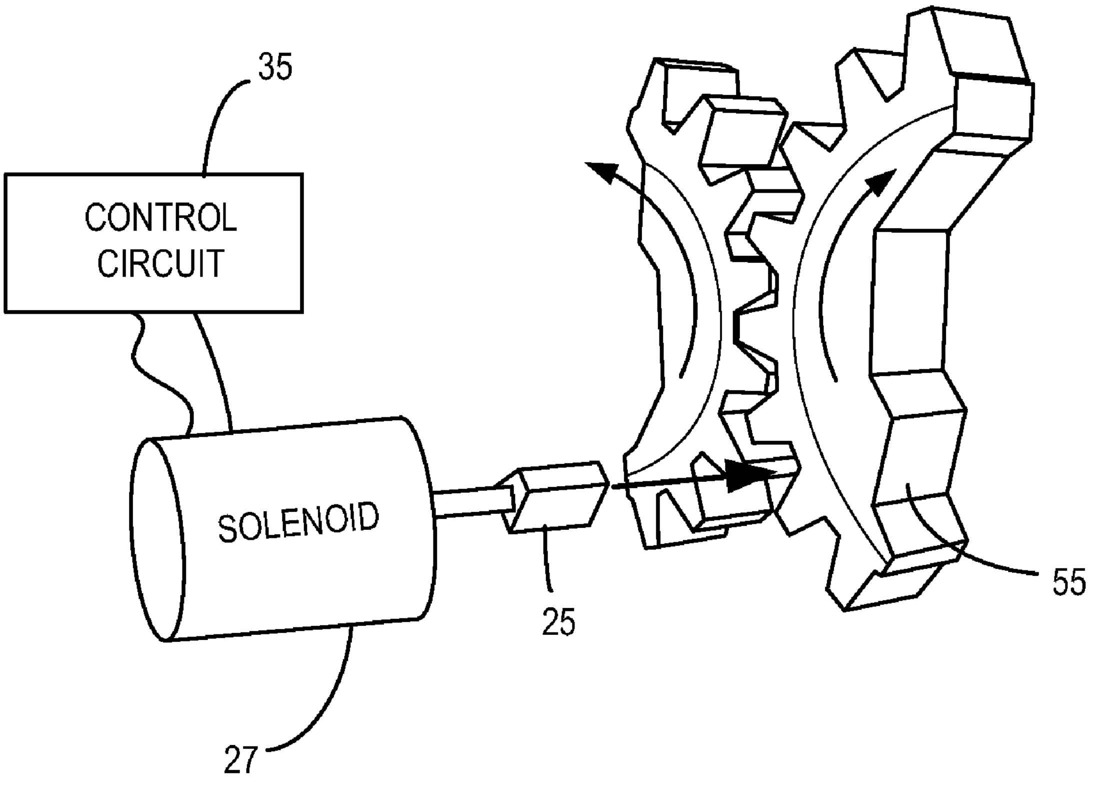
FIG. 6 is an illustration of an embodiment of an apparatus to stop the shredder gears from turning.

Turning to FIG. 6, yet other embodiments of the invention herein are illustrated. Control circuit 35 can actuate fast-acting solenoid 27 to deploy mechanical power restraint 25, which restrains the rotation of the shredder blades. For example, restraint 25 may be positioned proximate to a motive element of the power transmission system between motor and blades, such as the meshing gears represented at reference 55, which gears are synchronized with the rotation of the shredder blades.

When actuated and deployed, restraint 25 may engage a driving gear, a driven gear, or both. Upon contact with a shredder blade, the user bioelectric signal causes restraint 25 to be deployed between the meshing gear teeth 55 of a driving gear and a driven gear, rapidly decelerating and stopping the blades of the shredder. It is desirable that restraint 25 be constituted to absorb the residual rotational momentum force of the shredder blades, of a durable, resilient, wear-resistant, and shock absorbent material, such as, without limitation, high density polyethylene, although other material, such as a hardened natural rubber, also may be suitable. Materials for restraint 25 are preferred to be generally inexpensive and unlikely to damage meshing gear teeth 55. Restraint 25 can be in the form of a rubber chock, which can be mounted onto a quick-acting solenoid 27 for rapid, affirmative setting of restraint 25. The chock can be constituted of a durable, resilient, wear-resistant, and shock absorbent material, for example, a rubber material.

Typically, solenoid 27 could be in the form of a push-type solenoid, actuated by control circuit 35 in response to the bioelectric signal emanating from a living being in contact with shredder blade. Prior to deployment of restraint 25, the shredder motor can be deactivated, after which solenoid 27 can be actuated, thus interposing chock 25 between meshing gears 55 to effect a rapid, "soft stop." A "soft stop" significantly reduces the likelihood that neither meshing gears or other mechanical power transmission system elements, nor the user contacting the shredder blade, will experience traumatic contact with the shredder blade.

Other embodiments can employ a clutch as mechanical power restraint 25 to stop moving shredder. For example, the clutch can disengage a gear from a rod connected to the gear thereby causing the rod to stop turning due to the frictional forces associated with the blade interactions. Another clutch example could be a clutch between the motor and a gear box that would disengage the torque delivered by the motor. Yet another embodiment could include a circuit that reverses the current flow to the motor to a degree that counteracts the direction of movement by the motor thereby causing a type of electromagnetic braking. Such a system may produce very little, if any, reverse direction by the motor.

Figure 7:
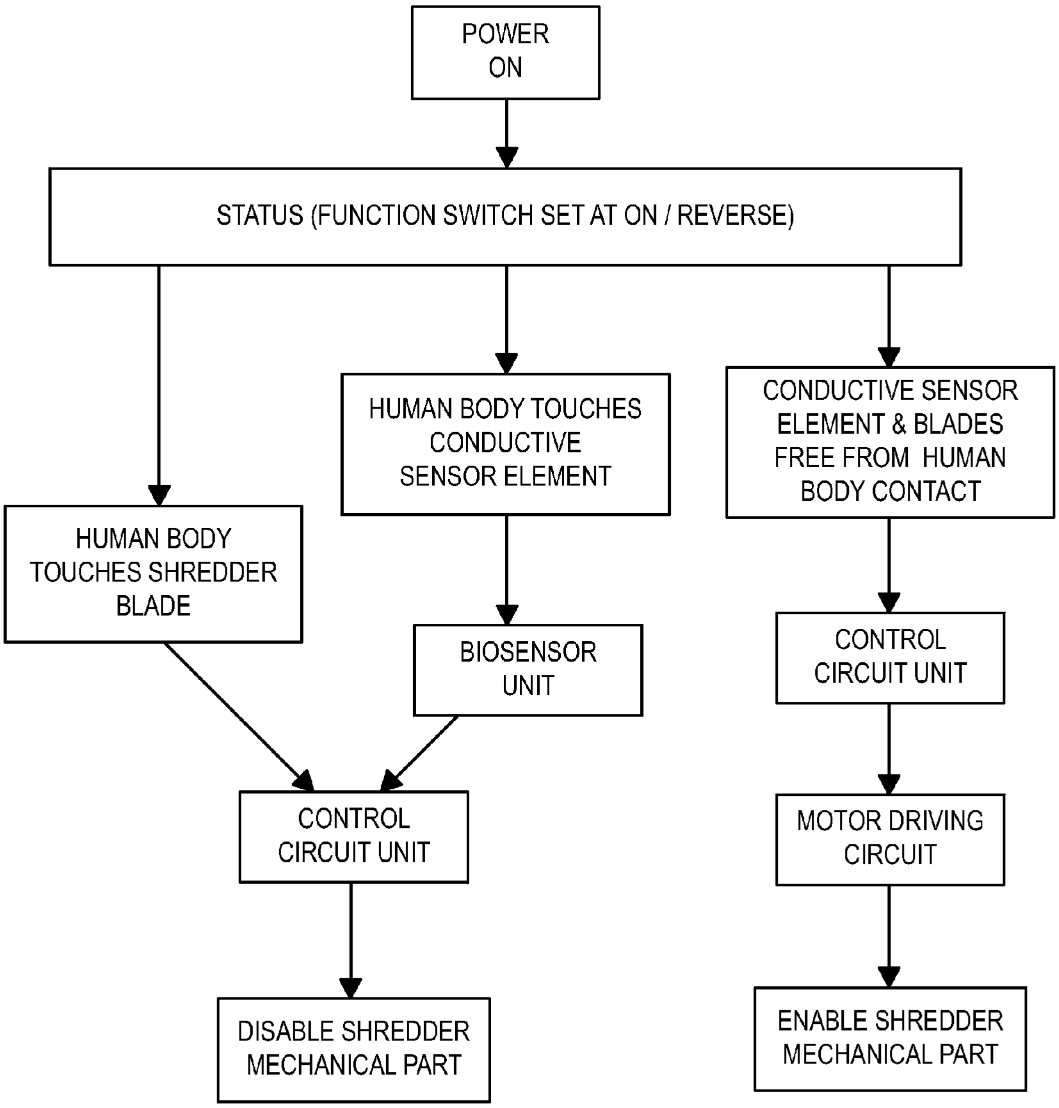
FIG. 7 is a flow chart illustrating the operation of an embodiment of the invention.

FIG. 7 illustrates a dual-phase method 700 of operating a touch-sensitive paper shredder control system. In a first phase, paper shredder provides a first sensor response in a first sensing process. In a second phase, paper shredder provides a second sensor response in a second sensing process. In embodiments herein, a first phase can be constituted of a shredder blade sensor sensing contact with a living being by receiving bioelectricity (a "bioelectric signal") from the living being in a manner indicating contact. A second phase can be constituted of a conductive touch panel sensing contact with a living being by receiving a bioelectric signal from the living being in a manner indicating contact. In certain embodiments, the first phase process can include coupling the bioelectric signal to the control circuit unit. In response, the control circuit unit can de-energize the paper shredder motor and deploy a restrainer into the mechanical power transmission system, bringing the shredder blades to a rapid and complete stop. Similarly, the second phase process can include coupling a bioelectric signal applied to the conductive panel to the touch panel unit which, in turn, couples a representation of the bioelectric signal to the control circuit unit. In response, the control circuit unit can de-energize the paper shredder motor, causing the shredder blades to stop.

In other embodiments, a single phase can be provided by the first sensing process, in which a shredder blade sensor senses contact with a living being by receiving a bioelectric signal from the living being in a manner indicating contact. A representation of the bioelectric signal then can be coupled to the control circuit unit. In response, the control circuit unit can de-energize the paper shredder motor and deploy a restrainer into the mechanical power transmission system, bringing the shredder blades to a rapid and complete stop.

Figure 8:
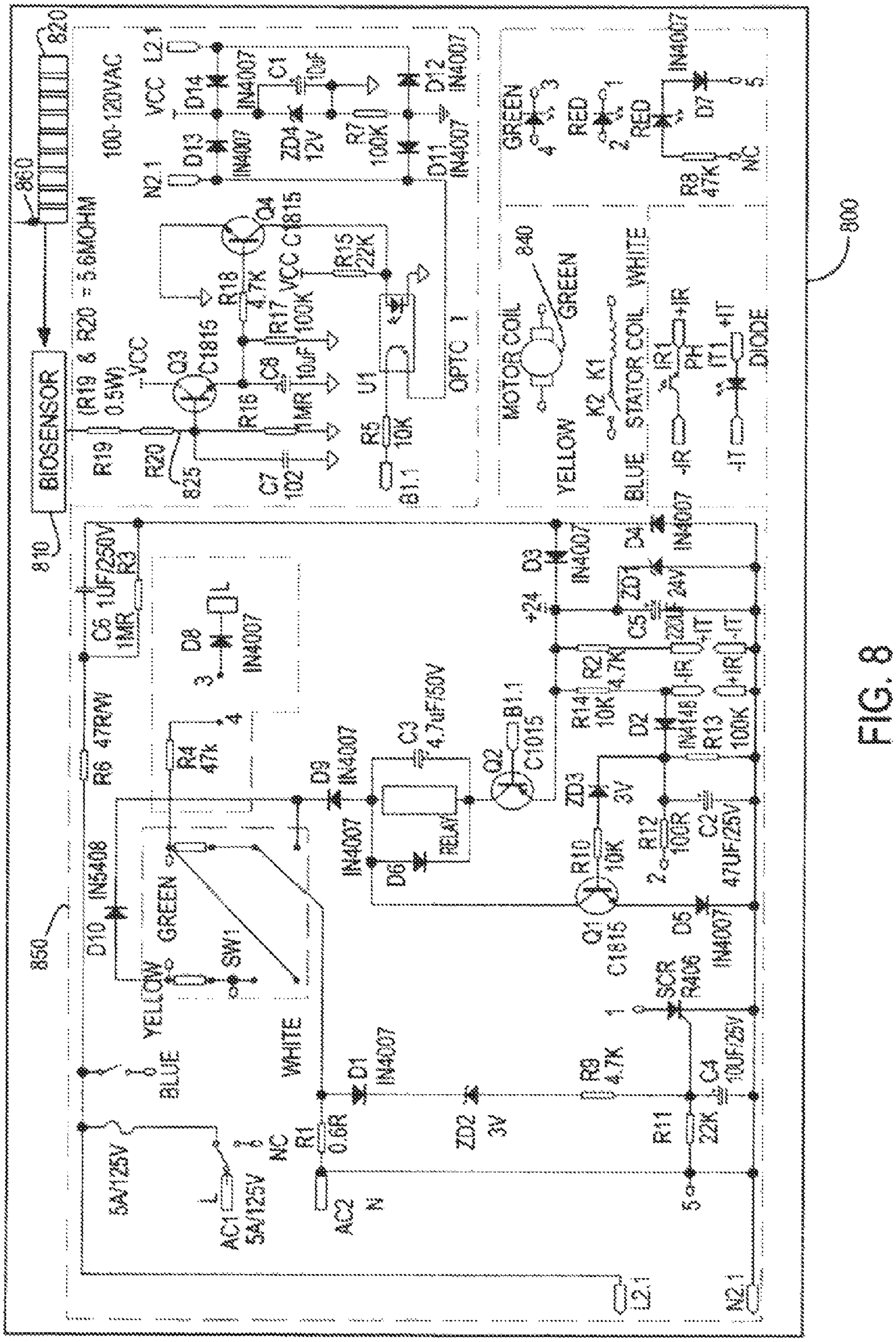
FIG. 8 is a circuit diagram of the electrical components of an embodiment of a touch-sensitive paper shredder blade control system, in accordance with the teachings of the present invention.

FIG. 8 is a circuit diagram illustrating an example embodiment of a touch-sensitive shredder blade control circuit 800. Although FIG. 8 shares some functional similarities with the touch panel-related control circuit of FIG. 3, it will be appreciated by one skilled in the art that touch-sensitive shredder blade control circuit 800 in FIG. 8 is distinct from the circuit of FIG. 3, most notably in the adaptation of touch control system 810 to be sensitive to bioelectricity received from a living being and sensed at shredder blade 820.

In response to the sensed touch of a metal shredder blade by a living being, touch control system 810 can produce a signal 825 representative of the sensed bioelectricity by activation (ON) of cascaded transistors Q3 and Q4. Biosignal 825 can be coupled to Q2 of main control circuit 850 by way of an optoelectric coupler OPTO1. OPTO1 may further isolate the living being touching shredder blade 820 from the potentially lethal electric power being used to actuate motor 840. Transistor Q2 can operate as a switch, and when a representation of a biosignal is received from OPTO1, Q2 can be configured to turn OFF, actuating electromechanical restraint element 860. Electromechanical restraint element 860 can include a relay coil, which can de-energize motor 840, when Q2 is turned OFF. In addition, electromechanical restraint element 860 may include a solenoid coupled to a mechanical power transmission restraint.

In the context of FIG. 6, a non-limiting example of a solenoid coupled to a mechanical power transmission restraint may be solenoid 27 coupled to mechanical power transmission restraint 25. When Q2 is turned OFF, the solenoid can de-energize, causing mechanical power transmission restraint 25 to be driven into the mechanical power transmission elements, such as meshing gears 55. Alternatively, another non-limiting example of a mechanical power transmission restraint may be a clutch coupled to electromechanical restraint element 860. In yet another non-limiting alternative, mechanical power transmission restraint 25 may be implemented using a chock and a clutch, where electromechanical redundancy is elected.

Figure 9:
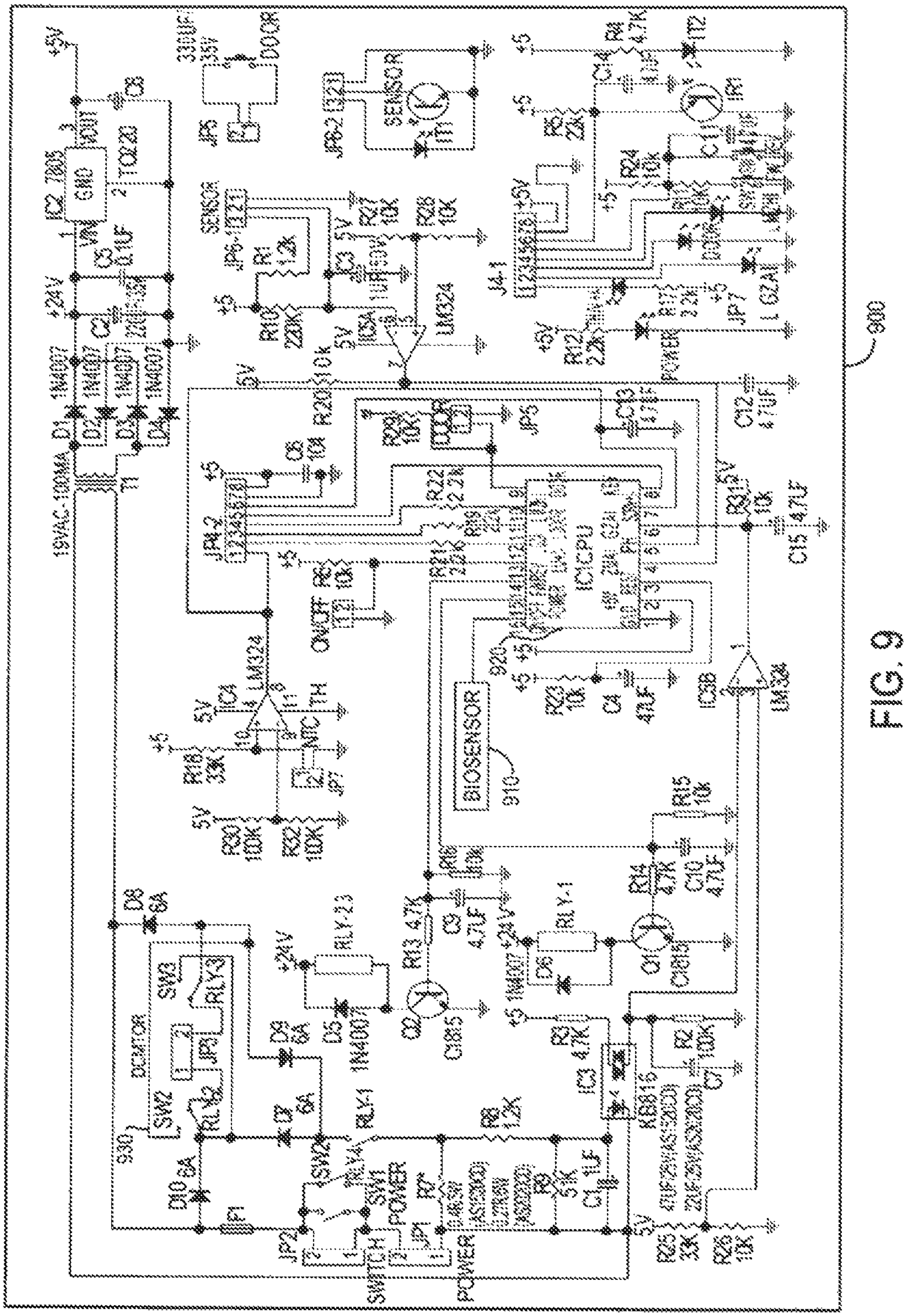
FIG. 9 is a circuit diagram of the electrical components of another embodiment of a touch-sensitive paper shredder blade control system, in accordance with the teachings of the present invention.

FIG. 9 is a circuit diagram illustrating another example embodiment of a touch-sensitive shredder blade control circuit 900. Blade touch sensor 910 can be coupled to an integrated circuit IC1 920, for example, at PIN 16. A biosignal received from blade biosensor 910 is received on PIN 16 which, in turn, deactivates or sets a LOW power signal on PIN 15. The LOW power signal is received by NPN transistor Q1, which turns OFF in response to the LOW signal, causing motor 930 to be de-energized. In addition, it may be possible to configure IC1 920 to provide a HIGH signal on PIN 14 (Motor Forward/Reverse). A HIGH signal from PIN 14 can be coupled to turn ON NPN transistor Q2 a reverse motion in motor 930, at least long enough to perform electrical braking of the shredder blade. In addition, transistor Q2 and relay RLY-2.3 may be elements of an electromechanical restraint element, which also may include a chock mechanical restraint, a clutch mechanical restraint, or both.

In other embodiments of the present invention, a standoff biosensor having a metalized contact element can be connected to an inner portion of a shredder assembly other than a shredder blade. When a living being contacts the metalized contact, the standoff biosensor actuates a control circuit unit to cause a safety stop. A safety stop can be characterized by de-energization of the shredder motor moving in the forward (shredding). Also, in a safety stop, a restraint may be deployed to substantially immediately stop motion of the shredder blades. Further, in a safety stop the shredder motor can be momentarily energized in the reverse direction to cause electromotive braking of the shredder blade.

Figure 10:
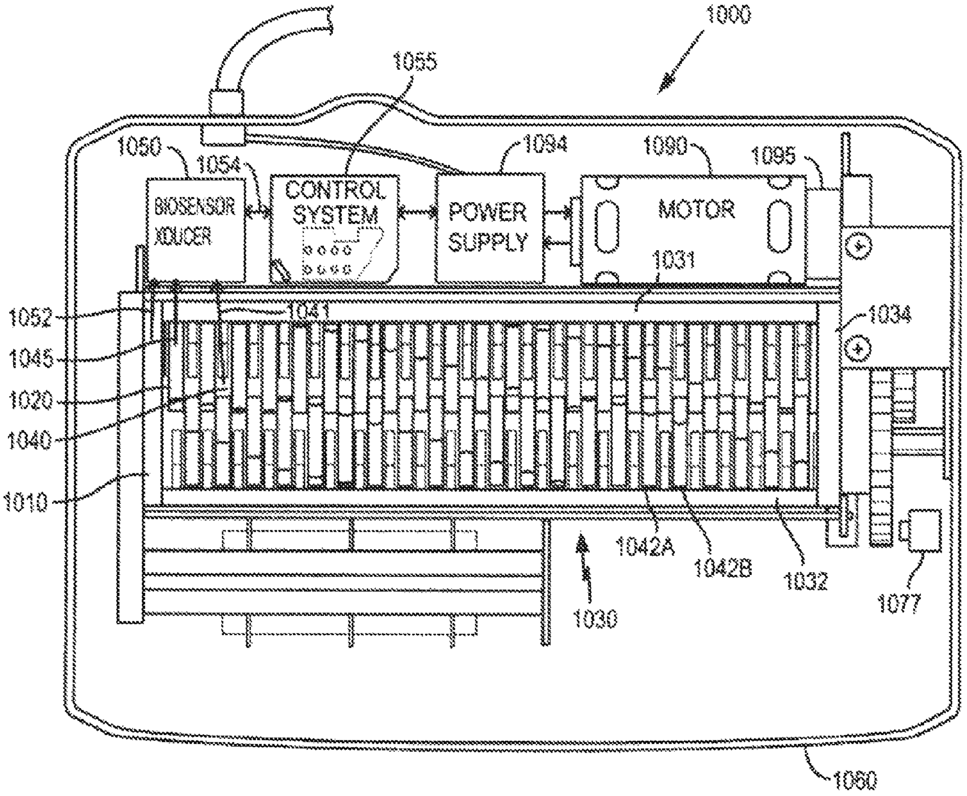
FIG. 10 is a top plan view of yet another embodiment of a touch-sensitive paper shredder control system, in accordance with the teachings of the present invention.

Turning to FIG. 10, shredder assembly (for convenience, "shredder") 1000 may be configured with inner housing 1010 in which shredder blade 1020 can be disposed. Inner housing 1010 of shredder 1000 can include a frame, generally at 1030, at least partially surrounding blade 1020. Support frame 1030 may include one or more generally horizontal support frame members, for example, member 1032 and one or more generally vertical frame members, for example member 1034, (with "horizontal" being oriented in parallel with a longitudinal axis of shredder blade 1020.

In selected ones of the non-limiting example embodiment of shredder 1000, at least a portion of at least one member of support frame 1030 can be metalized, forming a metalized contact element. The metalized contact element can be a portion of the metalized frame member. In certain selected embodiments support frame 1030 can be constituted of conductive metal members, such that essentially the entire support frame can be a metalized contact. Metalized support frame 1030 can be supported on shredder lower housing 1060. Frame 1030 can provide improved structural support for the shredder blade 1020 within shredder 1000 and, perhaps, for shredder motor 1090 and mechanical power transmission, represented by motor drive shaft 1095.

In general, the metalized contact element, such as represented by support frame member 1032 or 1034, stands off from (i.e., is not in contact with) shredder blade and may be interposed between an inlet to the shredder blade (in an upper housing, not shown) and shredder blade 1020 itself. Typically, the metalized contact element 1032 is coupled to a transducer 1050, which receives bioelectric signal 1052 from a living being (not shown) in contact with the metalized contact element 1032, and which produces a representation 1054 of the bioelectric signal. Metalized contact element 1032 coupled to transducer 1050 can be described as a standoff biosensor (in combination, standoff biosensor 1051) and a representation 1054 of the bioelectric signal can be described as a biosignal. Standoff biosensor 1051 can be actuated to couple biosignal 1054 to control circuit unit 1055. Standoff biosensor 1051 can be used to sense the proximate contact of a living being (not shown) relative to shredder blade 1020, without the living being making contact with shredder blade 1020.

In response to standoff biosensor 1051 detecting proximate contact, control circuit unit 1055 can effect a safety stop, bringing shredder blades 1020 to a rapid and complete stop. During a safety stop control circuit unit 1055 de-energizes power supply 1094 of paper shredder motor 1090, may deploy an aforementioned restraint into the mechanical power transmission system 1095, or both. In embodiments in which reverse motor motion is permitted, control circuit unit 1055 may momentarily energize paper shredder motor 1090 in a reverse direction to cause electromotive braking, which may further and more quickly reduce inertial shredder blade motion in the forward direction.

In non-limiting alternative example embodiments, also depicted in FIG. 10, a metalized contact element can be a segment, a strip, or a generally circumferential ring disposed in the shredder, set apart from and generally superior to the shredder blade 1020, relative to direction of feed into the paper shredder blade 1020. The form of the metalized contact element may be continuous or interrupted. As illustrated in FIG. 10, non-limiting embodiments of a metalized contact in the form of a strip may include metalized interblade spacer 1040, which can be disposed between adjacent shedder blade elements 1042A, 10428. One or more of metalized interblade spacers 1040 may be coupled to transducer 1050, such that transducer 1050 can receive bioelectric signal 1041 from metalized interblade spacer 1040, when in contact with a living being (not shown). Typically, interblade spacer 1040 is configured with a spacer contact surface positioned in a stand off posture, relative to and apart from, adjacent shedder blade elements (for clarity, blade elements 1042A and 1042B).

In such an embodiment, a living being coming into contact with metalized element 1040 can actuate biosensor transducer 1050 to transmit biosignal 1054 to control circuit unit 1055. In turn, control circuit unit 1055 can perform a safety stop by de-energizing power supply 1094, and removing power from paper shredder motor 1090. During the safety stop, control circuit unit 1055 also may deploy an aforementioned restraint into the mechanical power transmission system 1095 bringing shredder blades 1020 to a rapid and complete stop. Where shredder motor 1090 is configured for reverse motion, control circuit unit 1055 can cause electromotive braking by energizing motor 1090 to turn in reverse direction. In some embodiments where electromotive braking is used, control circuit unit 1055 may deploy an aforementioned restraint generally concurrently with a momentary electromotive braking of sufficient duration to bringing shredder blades 1020 to a rapid and complete stop.

Combinations of aforementioned safety elements would be readily apparent to a person having ordinary skill in the art in light of the present teachings. In a first non-limiting example, plural metalized members of support frame 1010 can be electrically coupled to each other as well as to transducer 1050, so that control circuit unit 1055 may cause a safety stop in response to contact between a living being and a coupled surface of frame 1010. In a second non-limiting example, multiple ones of metalized spacers 1040 can be electrically coupled to transducer 1050, so that control circuit unit 1055 may cause a safety stop in response to contact between a living being and one of metalized spacers 1040. In a third non-limiting example, plural metalized members of support frame 1010 and multiple ones of metalized spacers 1040 can be electrically coupled to transducer 1050, so that control circuit unit 1055 may cause a safety stop in response to contact between a living being and at least one of a metalized member, a metalized spacer, or both.

Figure 11:
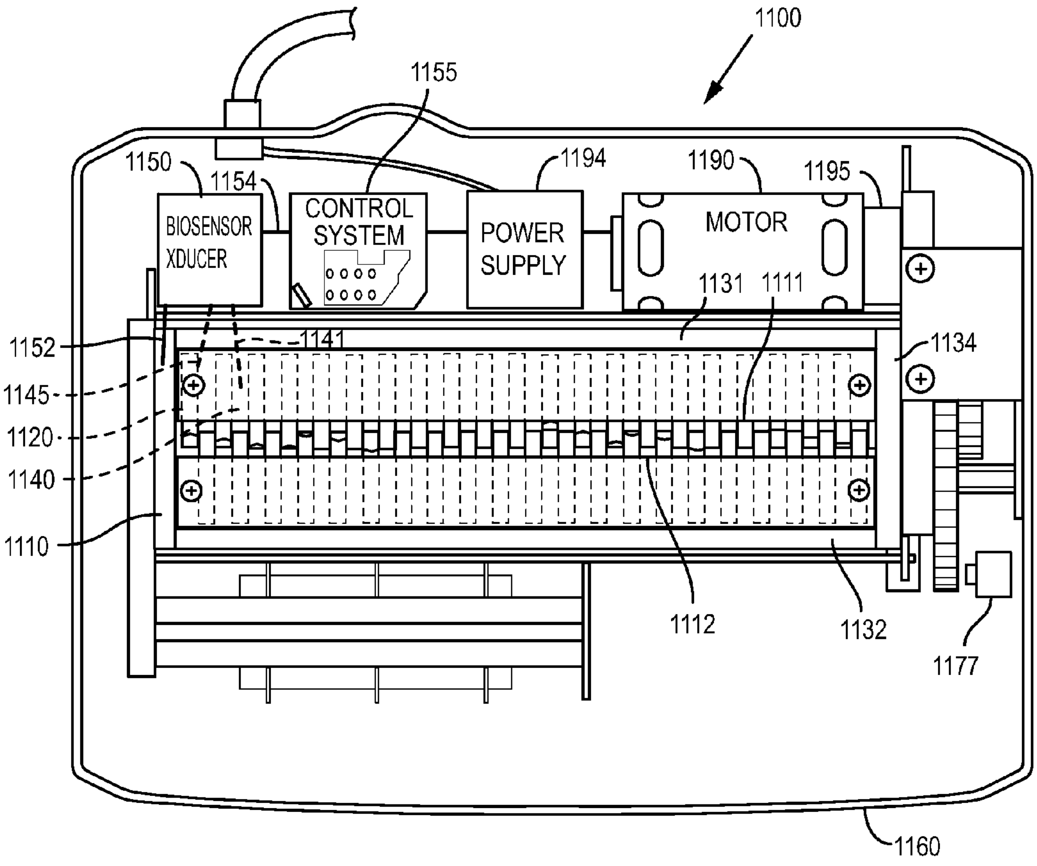
FIG. 11 is a top plan view of still another embodiment of a touch-sensitive paper shredder control system, in accordance with the teachings of the present invention.

FIG. 11 illustrates a top view of shredder assembly 1100, with a vantage similar to shredder 1000 in FIG. 10. In selected other non-limiting example embodiments according to the present invention, shredder frame (generally at 1110) can be coupled to blade shield 1111, 1112 with individual blade shield members 1111 and 1112 being set apart by a predetermined shield gap 1115, relative to the longitudinal axis of shredder blades 1120. Predetermined shield gap 1115 can be sized to limit access of material to be shredded to the region encompassed within shield gap 1115. Blade shield members 1111 and 1112 can be positioned above, and set apart from shredder blades 1120. Typically, shield gap 1115 can be disposed beneath, and longitudinally aligned with a feed opening (not shown) of shredder 1100. Shield gap 1115 stands off sufficiently from blades 1120 to allow expected normal operation of paper shredder 1100 to proceed, but to limit access to shredder blades 1120 and their immediate, and hazardous, environs.

One or both of blade shields 1111, 1112 may be electrically coupled to biosensor transducer 1150, forming in combination biosensor 1151. Blade shield 1111, 1112 receive bioelectric signal 1141 transmitted from a living being in contact with electrically coupled blade shield 1111, 1112, and can transmit bioelectric signal 1152 to transducer 1150, in response, transducer 1150 can generate biosignal 1154 which can be received by control circuit unit 1155. When a biosignal 1154 is received by control circuit unit 1155, control circuit unit 1155 can respond by effecting a safety stop. Similar to a safety stop corresponding to shredder 1000 in FIG. 10, control circuit unit 1155 can respond to biosignal 1154 by de-energizing power supply 1194 and, in turn, removing power from shredder motor 1190, bringing shredder blades 1120 to a rapid and complete stop. In some embodiments, a safety stop caused by control circuit unit 1155 also may deploy an aforementioned restraint into the mechanical power transmission system 1195. As with shredder 1000 in FIG. 10, a safety stop caused by control circuit unit 1155 also may perform electromotive braking to reduce inertial movement of shredder blades 1120.

Blade shield 1111, 1112 can improve structural strength and integrity of shredder 1100, and also provide enhanced product reliability, extended product service life, and reduced operational costs. Further, shield gap 1115 between blade shields 1111, 1112 may be adjusted in width such that the shield gap 1115 may approximately the same as a proximate, corresponding gap in a paper feed inlet opening (not shown) for shredder 1100. Also, shield gap 1115 may be disposed approximately equal to a proximate, corresponding gap in a paper feed inlet opening (not shown) for shredder 1100. In addition, shield gap 1115 may be disposed to be slightly narrower than proximate, corresponding gap in a paper feed inlet opening (not shown) for shredder 1100, while not impairing material being fed into blades 1120. In an example embodiment in which shield gap 1115 is slightly narrower than a proximate, corresponding gap in a paper feed inlet opening (not shown) for shredder 1100, touch contact between a living being and metalized contact sensor 1111, 1112 of biosensor 1151 can be more likely to cause a safety stop before the living being comes into contact with shredder blades 1120. Such an arrangement can enhance safety aspects of shredder 1100, even in environment where living beings are prone to direct probing of shredder 1100 internal mechanisms, or are engaged in maintenance or in testing of an energized shredder 1100.

In yet other alternative embodiments, safety stop apparatus and methods described relative to shredder 1000 in FIG. 10, and shredder 1100 in FIG. 11, may be used alone or in combination. In a fourth non-limiting example, touch contact between a living being and a blade shield 1111 electrically coupled to transducer 1150, can cause control circuit unit 1155 to perform a safety stop. Moreover, such blade shield embodiments of FIG. 11 also may be used in conjunction with one or more of non-limiting examples described with respect to FIG. 10. In a fifth non-limiting example, contact between a living being and one or more of a metalized member of frame 1010 or a metalized spacer, and one or more blade shield 1111, 1112 which can be electrically coupled to a transducer 1050 or 1150, causing control circuit unit 1055 or 1155 to perform a safety stop. Further, any of the foregoing non-limiting examples may be modified so that contact sensing by shredder blade 1020 or 1120, and by one or more of metalized frame members, metalized interblade spacers, or blade shield can cause a control circuit unit such as units 1055 or 1155, to perform a safety stop. A person having ordinary skill in the art would recognize foreseeable modifications and alternatives in light of the foregoing disclosure.

Beneficial Uses

Embodiments of the present invention provide the following beneficial uses:

1. Enhanced product safety for living beings, including adult and child humans, and pets.
2. Improved structural support for shredder assembly elements
3. Improved structural integrity of shredder 1100
4. Enhanced product reliability
5. Extended product service life
6. Reduced product operational costs and maintenance.

As detailed above, the touch-sensitive paper shredder control system has adopted cascaded circuits. On the machine feed throat there is a blade touch sensor, which is connected to bioelectricity controlled switching circuit, ground switching circuit, control circuit unit, and then shredder mechanical part, including a blade restraint. All of these circuits ensure safety when a human, or other living being, touches the touch-sensitive shredder blade. The electricity from a human body actuates the bioelectricity-controlled switching circuit, followed by all of the connected circuits. The control circuit unit disables the shredder mechanical part and it ensures human safety. Even if the power switch is turned on, the mechanical part of the shredder still won't work if a human is touching the touch-sensitive shredder blade. As with the aforementioned touch-sensitive panel, the shredder can use the touch-sensitive shredder blade to realize real time monitoring with a control process that is both safe and sensitive. The machine performance is stable and reliable. It is easy to operate without human intervention, can be applied in wide situations, and brings safety assurance.

Although the present invention has been described by way of example with references to the circuit drawings, it is to be noted herein that various changes and modifications will be apparent to those skilled in the art. Therefore, unless such changes and modifications depart from the scope of the present invention, they should be construed as being included therein.

What is claimed is:

1. A touch-sensitive paper shredder control system, comprising:
- a conductive shredder element;
- a shredder blade;
- a shredder mechanical part coupled to the shredder blade and configured to stop the shredder blade;
- a control unit coupled to the conductive shredder element and capable of detecting bioelectricity from a living being applied to the conductive shredder element, the control unit coupled to the shredder mechanical part and configured to stop the shredder blade responsive to detected bioelectricity.

2. The touch-sensitive paper shredder control system of claim 1, wherein the shredder mechanical part further comprises a mechanical restraint having a clutch.

3. The touch-sensitive paper shredder control system of claim 1, further comprising:
- an electromagnetic motor coupled to the shredder mechanical part and coupled to the shredder blade, wherein motor operation drives shredder blade motion; and
- an electromagnetic braking circuit coupled in the control unit to the motor, wherein the control unit is configured to cause electromagnetic braking of the motor, and
- wherein the control unit provides substantially real-time monitoring of contact between the conductive shredder element and a living being, and wherein the control unit causes electromagnetic braking of the motor responsive to living being contact with the conductive shredder element.

4. The touch-sensitive paper shredder control system of claim 1, wherein:
- the shredder mechanical part includes a reversible shredder motor;
- the control unit includes a three position switch having, on, off, and reverse positions; and
- the control unit is operable to disable the reversible shredder motor when the three position switch is in the ON position or in the REVERSE position.

5. The touch-sensitive paper shredder control system of claim 1, wherein:
- power to the reversible shredder motor is controlled by a relay switch.

6. The touch-sensitive paper shredder control system of claim 1, wherein the bioelectricity is a static electrical charge produced by the living being.

7. The touch-sensitive paper shredder controller of claim 1, wherein the bioelectricity is a flowing electrical charge produced by the living being.

8. A touch-sensitive paper shredder system, comprising:
- a shredder motor;
- a bioelectricity-controlled switching circuit including a biosensor coupled to a paper shredder blade;
- a shredder control unit coupled between the bioelectricity-controlled switching circuit and the shredder motor,
- wherein the bioelectricity-controlled switching circuit cooperates with the shredder control unit to stop the shredder motor when a living being-contacts, and applies bioelectricity to, the biosensor.

9. The touch-sensitive paper shredder system of claim 8 further comprising:
- an optical coupler interposed in an electrical path between the biosensor and the shredder control unit, wherein a bioelectricity signal from the bioelectricity-controlled switching circuit is coupled through the optical coupler to actuate the shredder control unit to stop an operating shredder motor.

10. The touch-sensitive paper shredder system of claim 9, further comprising a grounding switch circuit coupled to transmit to the optical coupler, a bioelectricity signal received from the bioelectricity-controlled switching circuit, wherein the grounding switch circuit couples the bioelectricity signal from the bioelectricity-controlled switching circuit to the optical coupler.

11. The touch-sensitive paper shredder system of claim 10, wherein the bioelectricity-controlled switching circuit further comprises:
- a first cascaded transistor having a base coupled to the biosensor, a collector coupled to a power supply, and an emitter coupled the base of a second cascaded transistor, wherein the emitter of the second cascaded transistor is coupled to an optical coupler input.

12. The touch-sensitive paper shredder system of claim 8, wherein the bioelectricity signal is a static electrical charge produced by the living being.

13. The touch-sensitive paper shredder system of claim 8, wherein the bioelectricity signal is a flowing electrical charge produced by the living being.

14. A touch-sensitive paper shredder system comprising:
- a shredder blade;
- a powered shredder motor coupled to the shredder blade;
- a biosensor responsive to bioelectricity from a living being with a biosignal;
- a control circuit unit, having a control switch coupled to the powered motor; and
- an optical isolator coupled to receive a biosignal from the biosensor and configured to electrically isolate the biosignal transmitted to the control circuit unit,
  - wherein, while the shredder is operating, the biosignal actuates the control circuit unit to operate a control switch to stop the powered shredder motor, and
  - wherein the control switch is a reed switch.

15. The touch-sensitive paper shredder system of claim 14, wherein the bioelectricity signal produced by the living being is one of a static electrical charge or a flowing electrical charge.

16. A method of controlling a paper shredder with a touch-sensitive device comprising:
- providing a powered shredder motor, which can be operated in one of a forward direction or a reverse direction;
- providing a shredder blade capable of being moved by the powered shredder motor;
- coupling a touch-sensitive sensor to the a shredder element, wherein the touch-sensitive sensor can be energized by a bioelectrical signal of a living being;
- providing a control circuit coupled to the touch-sensitive sensor and configured to receive a biosignal representative of a received bioelectric signal; and
- configuring the control circuit to cease operation of the powered shredder motor in one of a forward direction or a reverse direction, responsive to the living being contacting the touch-sensitive sensor.

17. The method of claim 16, further comprising:

providing electrical isolation between the touch-sensitive sensor and a voltage that operates one or both of the control circuit and the powered shredder motor.

18. A paper shredder safety system comprising:

a shredder blade;

a powered reversible shredder motor coupled to the shredder blade;

a safety control circuit coupled to the powered reversible shredder motor;

a ground switching circuit coupled to the safety control circuit;

a bioelectricity controlled switching circuit coupled to the safety control circuit, and including a touch-sensitive sensor, wherein when a bioelectricity signal is sensed from a living being in contact with the touch-sensitive sensor, the safety control circuit responsively actuates the ground switching circuit to stop the powered reversible shredder motor.

19. The paper shredder safety system of claim 18, further comprising:

a safety switch having an electrical member coupled to the safety control circuit and a mechanical member coupled to proximally mate with an articulating portion of a shredder chassis, wherein the electrical member transmits a safety switch signal to the safety control circuit when the proximal mating of the mechanical member and the articulating portion is disrupted, and wherein the safety control circuit actuates the control circuit to stop the powered reversible shredder motor, and wherein the electrical member includes the touch-sensitive sensor.

20. The paper shredder safety system of claim 19, wherein the touch sensitive sensor is connected to at least one of a paper shredder blade, a metalized paper shredder frame member, a metalized paper shredder blade spacer, or a metalized blade shield.

* * * * *